US006952769B1

(12) United States Patent
Dubey et al.

(10) Patent No.: US 6,952,769 B1
(45) Date of Patent: Oct. 4, 2005

(54) PROTOCOLS FOR ANONYMOUS ELECTRONIC COMMUNICATION AND DOUBLE-BLIND TRANSACTIONS

(75) Inventors: Pradeep Dubey, New Delhi (IN); Charanjit Singh Jutla, Elmsford, NY (US); Vijay Kumar, New Delhi (IN); Ravindran Sai Anand, Kerala (IN); Prasanna Ganesan, Kerala (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/550,462

(22) Filed: Apr. 17, 2000

(51) Int. Cl.[7] .................................................. H04L 9/00
(52) U.S. Cl. ....................................... 713/153; 713/154
(58) Field of Search ................................ 713/153, 154; 705/69

(56) References Cited

U.S. PATENT DOCUMENTS

| | | | | |
|---|---|---|---|---|
| 5,353,283 A * | 10/1994 | Tsuchiya | 370/392 |
| 5,473,603 A * | 12/1995 | Iwata | 370/426 |
| 5,588,060 A * | 12/1996 | Aziz | 380/30 |
| 5,812,670 A | 9/1998 | Micali | |
| 5,961,593 A * | 10/1999 | Gabber et al. | 709/219 |
| 6,266,704 B1 * | 7/2001 | Reed et al. | 709/238 |
| 6,502,135 B1 * | 12/2002 | Munger et al. | 709/225 |
| 6,591,291 B1 * | 7/2003 | Gabber et al. | 709/206 |

FOREIGN PATENT DOCUMENTS

| | | |
|---|---|---|
| EP | 0680187 A2 | 11/1995 |
| WO | WO 00/77642 A1 | 12/2000 |

OTHER PUBLICATIONS

Reed et al.; "Anonymous Connections and Onion Routing"; May 1998; IEEE Journal; vol. 16, issue 4; pp. 482-494.*
Reiter et al.; "Crowds: anonymity for Web transactions"; Nov. 1998; ACM Transactions on Information and System Security; vol. 1, issue 1; pp. 66-92.*
Schneier, Bruce; Applied Cryplography; 1996; John Wiley & Sons, Inc.; 2nd Edition; pp. 21-74.*
Examination report dated Aug. 19, 2003.
UK Search Report dated Nov. 29, 2001.

* cited by examiner

*Primary Examiner*—Gilberto Barron, Jr.
*Assistant Examiner*—Jung Woo Kim
(74) *Attorney, Agent, or Firm*—Whitham, Curtis & Christofferson, P.C.; T. Rao Coca

(57) ABSTRACT

A system and associated protocols for communication between two entities across a computer network operate such that the identities of the two entities remain concealed from each other, while ensuring that no third party is able to trace the existence of a conversation between them. The two entities correspond to each other through pseudonyms. The protocols are designed with an object to distribute trust so that an identity is not revealed by the compromise of any one agent involved in the execution of the protocol. No one agent can establish a correlation between a pseudonym and a physical address.

14 Claims, 11 Drawing Sheets

PROTOCOLS FOR ANONYMOUS ELECTRONIC COMMUNICATION AND DOUBLE-BLIND TRANSACTIONS

BACKGROUND OF THE INVENTION

1. Field of the Invention

The present invention generally relates to electronic commerce on a distributed computer network, such as the Internet, and more particularly, to a system and associated protocols for communication between two entities across a computer network such that their identities remain concealed from each other, while ensuring that no third party is able to trace the existence of a conversation between them. The invention aims to ensure that the anonymity thus provided does not depend on the existence of any single trusted agent (or trusted third party) and is not compromised by the existence of malicious agents within or outside the system.

2. Background Description

In U.S. Pat. No. 5,794,207 to Walker et al., there is proposed a method and an electronic apparatus that allows prospective buyers of goods and services to communicate a binding purchase offer globally to potential sellers, for sellers to conveniently search for relevant purchase offers, and for sellers potentially to bind a buyer to a contract based on the buyer's purchase offer. An example of this system can be seen in the Priceline.com business (see http://-www-.priceline.com), or in electronic procurement models. However, in this emerging world of e-commerce, the issue of privacy is believed by many to be a significant impediment to future growth.

David Chaum in an article entitled "Untraceable electronic mail, return addresses, and digital pseudonyms", *Communications of the ACM,* 24, 2 (February 1981), pp. 84–88, proposed a system for anonymous electronic mail which employs a set of forwarding agents called mixes. The routing of messages through the various mixes was performed using a source routing algorithm. Each mix collects a few messages, waits a period of time and sends the messages out in a different order. Mixes are meant to prevent global eavesdroppers from tracing messages passing through them and thus provide sender and receiver unlinkability. But since routing is done at the source, there is no receiver anonymity. The source knows the receiver's identity. The strength of mixes is that even if one mix in a path is not compromised, the system continues to provide sender-receiver unlinkability against global eavesdroppers.

M. K. Reiter and A. D. Rubin in an article entitled "Crowds: Anonymity for Web Transactions", ACM *Transactions on Information and System Security*, describes another approach. Crowds is a system consisting of a cooperative group of users which provides sender anonymity. It also provides receiver anonymity against local eavesdroppers and colluding forwarders called "jondos". But Crowds does not envisage providing receiver anonymity against the sender himself. The Crowds system is basically designed for anonymous access to web pages where it is understood that the sender knows the location of the page he wants to access.

SUMMARY OF THE INVENTION

It is therefore an object of the invention to provide a system and associated protocols for communication between two entities across a computer network such that their identities remain concealed from each other, while ensuring that no third party is able to trace the existence of a conversation between them.

The protocols of the present invention for communication between two entities across a network are such that their identities remain concealed from each other, while ensuring that no third party is able to trace the existence of a conversation between them. The two entities correspond to each other through pseudonyms. The protocols are also designed with an object to distribute trust so that an identity is not revealed by the compromise of any one agent involved in the execution of the protocol. No one agent can establish a correlation between a pseudonym and a physical address.

In contrast to mixes as described by Chaum, supra, our system is meant to provide receiver anonymity and does not attempt to defend itself against a global eavesdropper by direct means. The probability of compromise of identity in our system is a polynomial function of the number of compromised agents. Therefore, our system promises that the expected number of compromises will not be proportional to the number of compromised agents. The loss would be less than proportional when the number of colluders is low.

In contrast to crowds described by Reiter and Rubin, supra, our system provides receiver anonymity against the sender himself by making him communicate with a third party and addressing the message to a pseudonym.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

There are essentially two aspects to double blind transactions, sender anonymity and receiver anonymity. There have been many approaches proposed for sender anonymity, among which are mixes (see D. Chaum) and Crowds (see Reiter and Rubin). Receiver anonymity is provided by a technique described in detail in the following section. Essentially, there are a set of forwarding agents who, individually, do not possess sufficient information to compromise an identity, but can collectively forward a message to the right destination.

The System

The system consists of two parts, a set of clients and a set of Forwarding Agents (FAs). Let there be n FAs, say $F_1$, $F_2$, . . . , $F_n$. Several groups of these n agents, each of which consists of k members, are listed, where k ($0<k\leqq n$) is a fixed number considered sufficient to provide anonymity in the system. Each FA must belong to at least one group, but there is no restriction on the number of groups that an FA can belong to. Each of the FAs has its own pair of public and private keys for encryption and decryption, respectively, where the underlying cryptosystem scheme is some commutative public key cryptosystem (a commutative cryptosystem is a cryptosystem in which multiple decryptions, possibly with different keys, performed on a ciphertext produce the same result irrespective of the order in which such decryptions are done). One such cryptosystem is the RSA (Revest, Shamir and Adleman) cryptosystem. Each FA also has the appropriate keys required to perform secure digital signatures on documents and to verify the signatures of other FAs.

Figure 1:
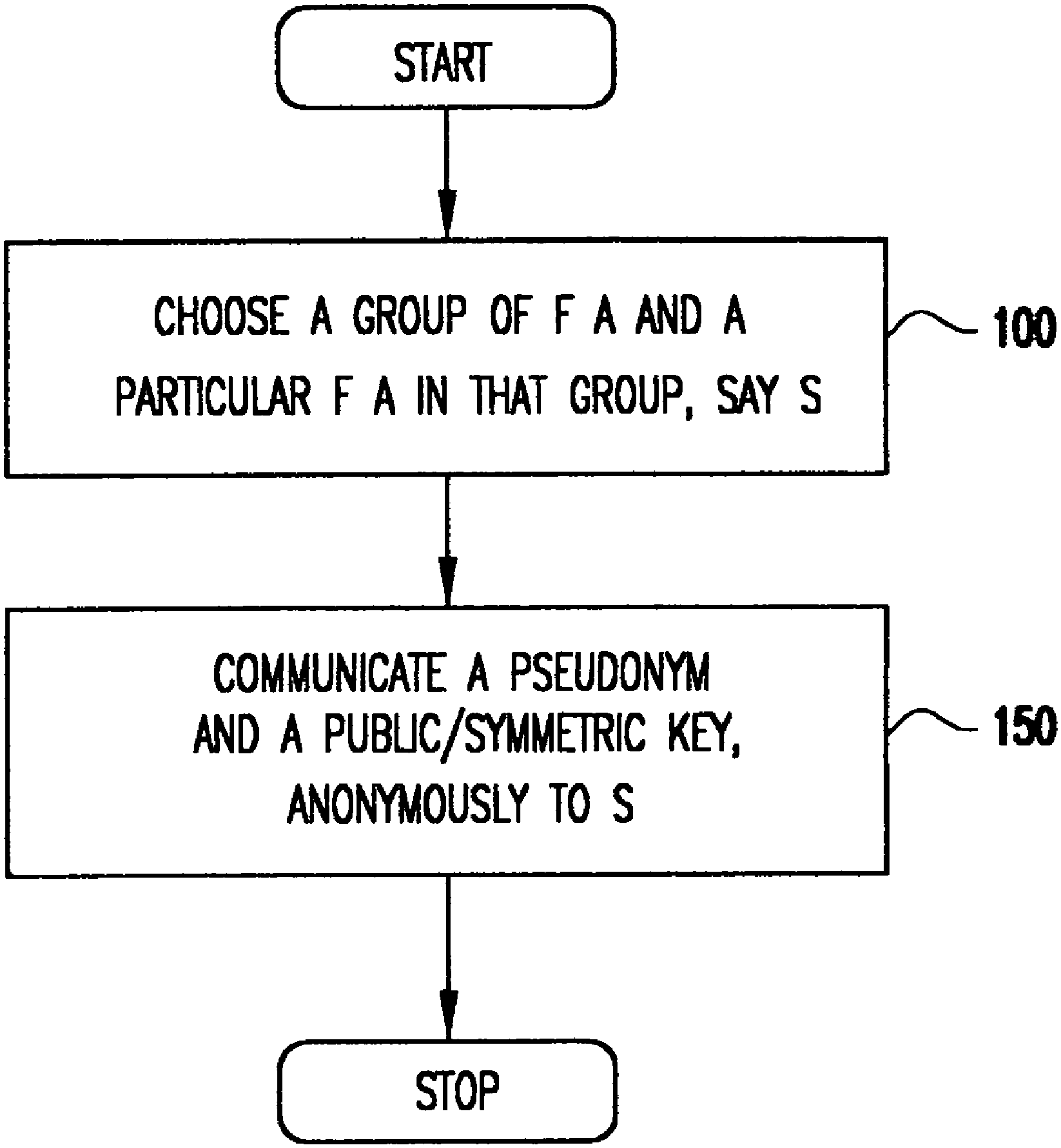
FIG. 1 is a flow diagram of the process of registration of an identity in the system according to the present invention.

As shown in FIG. 1, each client of the system has to initially register with a Forwarding Agent S of his or her choice in function block 100. The client, having selected a Forwarding Agent S, also picks one of the groups that the Forwarding Agent S belongs to, thus selecting k agents to be associated with the client. This registration process, as described in the next section, involves the assignment of a pseudonym to the client in function block 150. The client also provides the Forwarding Agent S with an encrypted form of his or her network address, rendering it unreadable to any individual FA, as described in the next section. Each FA maintains a table with three fields, namely a pseudonym, a corresponding encrypted network address and the FA group to be used for forwarding.

Informally, the system delivers a message as follows. A message meant for a pseudonym X arrives at the FA where X is registered. The message then goes through a random sequence of FAs. The set of FAs through which the message passes is fixed for each pseudonym. The last FA in the sequence finds a visible network address and sends the message on to this address. The next section describes this process in detail.

We describe below two variations of our protocol, which we refer to as Solution One and Solution Two, respectively. These two protocols are largely identical but differ in some steps and computations performed by agents. Below, we first describe the basic structure of the protocol which is common to both variations. The details in which they differ are then described separately for both.

The Basic Protocol

The protocol requires a prior process of registration before message forwarding can take place. The registration process is described in the first subsection below. The address provided by the client is actually an "onion" address (see P. F. Syverson, D. M. Goldschag and M. G. Reed, "Anonymous connections and onion routing", Proceedings of the 1997 IEEE Symposium on Security and Privacy), meaning that the address is encrypted with the public keys of many FAs each of which will in turn decrypt one layer of encryption, thus "peeling" the onion.

Registration

The client R picks one of the n forwarding agents (FAs) at random. Call it Forwarding Agent S. As described earlier, the client also picks a group of k agents to which the Forwarding Agent S belongs. Let these agents be represented by the names $S=A_1, A_2, A_3, \ldots, A_k$.

Let $P_i(Z)$ represent an encryption of Z using the public key of agent $A_i$. R encrypts his or her address D recursively with each of the k public keys of these k FAs, thus arriving at $P_1(P_2(\ldots(P_k(D))\ldots))$. Note that since a commutative encryption scheme has been adopted such as the RSA encryption algorithm, the order in which the k encryptions are performed to produce this "onion address" is irrelevant.

R then proceeds to send this "onion address" to the Forwarding Agent S along with his or her choice of pseudonym, say X. Of course, the Forwarding Agent S must not realize the correlation between the pseudonym and the actual address to S. So, the messages sent during registration must be sent through a scheme that protects the anonymity of the sender. This can be achieved, for instance, if the Forwarding Agent S is also a registered user of the system and has publicized its pseudonym, which can be used by R to anonymously send a message to S.

All messages intended for R will be addressed to X@S. These messages will first reach the Forwarding Agent S, and then go through a sequence of FAs to finally reach R, as described below.

Message Forwarding

Once the pseudonym X has been registered with a Forwarding Agent S, messages meant for pseudonym X can be accepted and successfully forwarded to the intended recipient. This takes place as follows.

Once the Forwarding Agent S obtains a message intended for X, it looks up X in its internal table. It retrieves two pieces of information from the table; an encrypted version of the address of X (which we will call the "onion address" of X (see Syverson)), as well as the group of FAs to be used for forwarding. The Forwarding Agent S then creates the list of the FAs that the message will pass through; that is, all FAs other than S who will have to "peel the onion" before the address of the intended recipient is revealed. This list contains all the members of the appropriate group except the Forwarding Agent S itself. S affixes this list to the head of the message.

The list of FAs needed for X is $S=A_1, A_2, \ldots A_k$. S "peels" one layer of the onion address of X, by applying its private key on the encrypted address, and places this peeled address in the message. S then selects the next forwarding agent at random and forwards the message to it.

Every other agent that receives this message performs some verifications to ensure that the protocol has been followed correctly by other agents so far. It then removes one layer of encryption from the onion address received by it. If it is the last agent, it forwards the message to the address thus obtained. Otherwise, it selects an agent at random from the list of agents to be visited contained in the message header. It then forwards the message to the selected agent after updating certain information, including the list of unvisited agents and the onion address, in the message header.

Encryption

All communication between any two Forwarding Agents is encrypted so that an eavesdropper is not able to correlate messages entering and leaving an agent. Such encryption may be dispensed with if it is not considered necessary to guard against global eavesdroppers (for instance, if the FAs are spread far and wide geographically preventing anyone from tracing a message from its point of origin to its terminus).

Each pseudonym shares a secret symmetric key with the FA with which it is registered. When the FA receives a message intended for that pseudonym, it encrypts the message with this symmetric key, after adding a fixed number of random bytes to each encryption block of the message. For example, if the 64-bit DES (Data Encryption Standard) is used, the FA inserts two random bytes before every six bytes of the actual message, and then encrypts the message. The recipient simply discards the first two bytes of every 8-byte block that he receives. The purpose is to defeat attacks in which an adversary sends multiple, identical copies of a message in succession.

DETAILED DESCRIPTION

Figure 2:
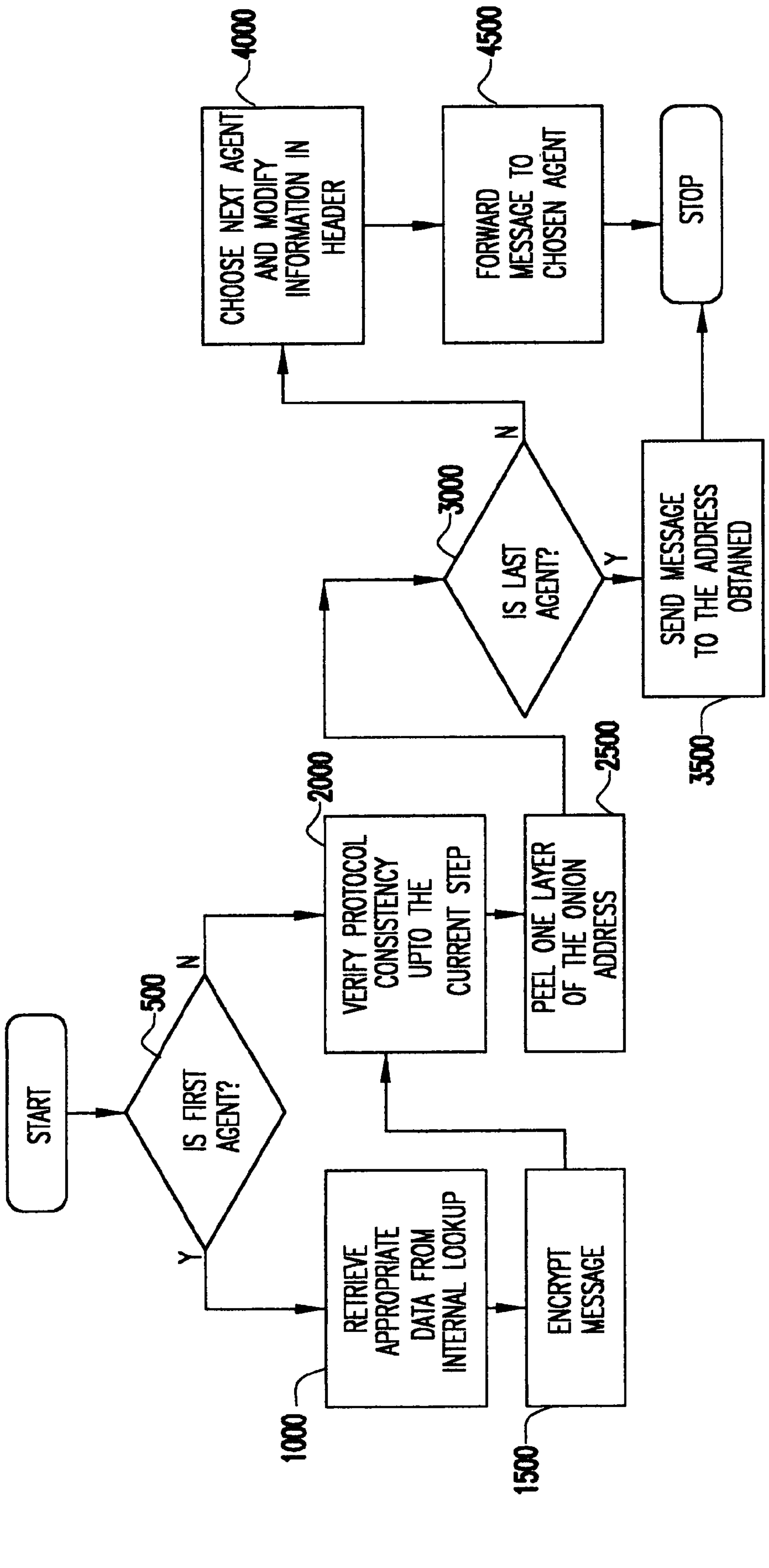
FIG. 2 is a flow diagram showing the implementation of the forwarding algorithm according to the present invention.

At each step, the process outlined above takes place as illustrated in FIG. 2. Each agent A, on receiving a message, first verifies that the signed sequence of steps that the message has supposedly gone through is consistent. This is shown in FIG. 2 starting at decision block 500, which determines if A is the first agent. If not, execution continues to function block 2000. Otherwise, the appropriate data is retrieved using an internal table lookup in function block 1000 and the message is encrypted in function block 1500.

Figure 3:
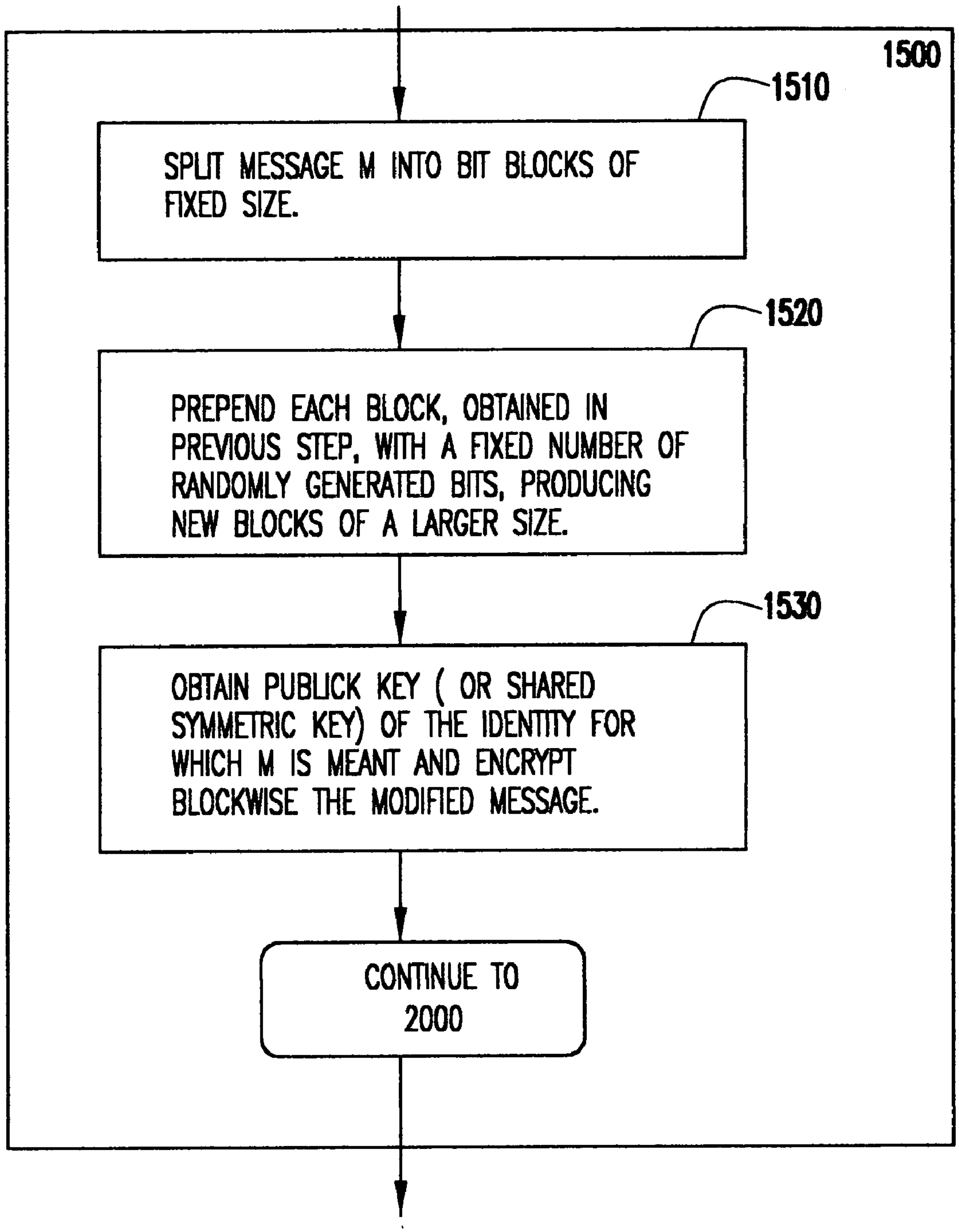
FIG. 3 is a flow diagram of the setup process for modification of a message at the originating agent's end as performed in the process of FIG. 2.

This encryption is illustrated in detail in FIG. 3 and involves 3 steps. In function block 1510, the message is split into blocks of a fixed size. Then in function block 1520, each such block is prefixed with a fixed number of random bits, producing blocks of a larger size. In function block 1530, A retrieves the public key (or shared symmetric key) of the intended recipient and encrypts each block with this key. Following this, the execution continues to function block 2000 in FIG. 2.

In function block 2000, protocol consistency is verified. Our two protocols perform this verification in different ways, and accordingly, the process is described separately for the two protocols in later sections. Following the verification process, in function block 2500 the agent A decrypts one layer of the recipient's "onion address". Then in decision block 3000, it checks whether any more agents remain to be visited. If not, in function block 3500 the message is forwarded to the address that was obtained in function block 2500. Otherwise, in function block 4000, the agent selects the next agent that will receive this message. Again, our two protocols differ in the details of this selection process, and therefore, the process is described separately for the two protocols in the following sections. After this, the execution continues to function block 4500, where the message is forwarded to the chosen agent.

Two Enhancements

The security of this protocol can be enhanced further by two simple modifications to the protocol. Firstly, instead of addressing a message to X as X@P, we could let P itself be a pseudonym, so that the message is actually addressed as X@P@R where R happens to be a real address and X and P are pseudonyms. Once R gets the message, it tunnels it to P using the same strategy outlined earlier and P, in turn, forwards the message to X. Instead of making the sender having to insert the names of the intermediate agents, we make the receiver do the groundwork by registering at multiple spots and setting up the sequence in which the message goes through them. Then the sender does not have to address a message as X@P@R. He just addresses it to X@R. R will send the message to P because X would have given the encrypted address of P while registering with R. When P gets the message, he or she will send it to X because X would have given him or her his or her own encrypted address while registering. This is easily generalized for any number of intermediaries.

For even greater security, the receiver can register at each spot with exactly two pseudonyms, with every two consecutive points sharing one pseudonym and the non-consecutive ones not sharing any pseudonym.

The second enhancement involves a restriction on the number of messages that can be received by any one person within a certain period of time. This is important to prevent a correlation being made on the basis of the number of messages heading for the same destination. The FA with which a person is registered keeps track of the number of messages destined for his or her pseudonyms. Simultaneously, all agents which forward a message to an actual destination also keep track of the number of such messages. If the originating FA is malicious and does not impose this limit, it is likely that one of the endpoints will detect an abnormally high number of messages intended for a particular address and will bring the system to a halt.

Solution One

The Signature Process

In Solution One, we record the path followed by every message through the system, in order to ensure and check that all agents follow the protocol correctly. This path information is stored in the message header. To ensure that it is not modified by dishonest agents, pieces of this information are digitally signed by various agents along the path.

This requires a random number N to be chosen as the tag for each message and affixed to it by the Forwarding Agent S, the first agent involved in the forwarding of that message. It is desirable that the Forwarding Agent S should be prevented from choosing the random number N in a non-random manner. This can be done by adopting one of two approaches. The first approach is to use an agreement protocol to select the random number rather than allowing the Forwarding Agent S to choose it himself. A simpler approach would be for each FA to maintain a list of the most recently used random numbers and ensure that the Forwarding Agent S does not try to repeat any of the numbers recently used. This would be sufficient because the protocol simply requires a distinct tag for each message. The statistical distribution of these numbers does not matter.

The Forwarding Agent S then selects the next forwarding agent at random. Let the FA thus selected be $A_j$. The Forwarding Agent S then combines $A_j$'s name with the tag N and digitally signs the resulting plaintext. Such combining can be in done in many ways, such as by adding or concatenating. It then places the plaintext together with the digital signature created at the head of the list and removes $A_j$ from the list. Finally, the message is sent to $A_j$. The message is also affixed with the name of the Forwarding Agent S, the first FA.

When any other agent A receives this messages, it verifies the integrity of the path information in the header by verifying a succession of signatures. Before forwarding the message to another agent B, A uses the random number N to sign and record the identity of B in the message header. The details of the signing and verification steps are provided in later sections.

The random number N is necessary to prevent the forging of digital signatures since otherwise the signature can be stored and reused by malicious FAs.

Domains

It is undesirable that the identity of the first FA in the path is visible to every FA on the path. This information could prove useful in case the last FA in the path is malicious and involved in an effort to target the anonymity of messages received by a particular recipient. The last FA can correlate the message with its recipient. If it can also correlate the message with its first FA, it would know which FA to compromise in order to learn the pseudonym of the recipient.

In Solution One, we conceal the identity of the first FA from most of the FAs by splitting the agents into domains. Once the message enters a domain, it visits all the FAs in the domain; when it leaves the domain, there is a marker attached to the head of the message indicating that the particular domain has been visited. All domains except the first are visited in a random sequence. The protocol is followed just as outlined earlier within each domain. Here, the originating agent is known only to the FAs in the initial domain. The only situation in which the final FA in the chain can learn the identity of the originator is if there is a colluding agent in the first domain who broadcasts his knowledge of the originator to all other colluding agents. It does not pay for a malicious agent to mark a visited domain as unvisited unless that domain consists only of malicious agents. Otherwise, an honest agent in that domain may get the same message twice due to which he would apply his private key on the recipient's address twice, rendering the address useless. Of course, marking an unvisited domain as visited would prevent the agents in this domain from applying their keys on the address thus rendering the recipient unidentifiable.

We partition the agents into domains in such a manner that each domain has a fixed number of FAs, d chosen to be a factor of k. We thus have k/d domains. This partition should not be done absolutely statically because that gives the adversary infinite time to try and compromise one agent in each domain. One traitor in each domain would prove sufficient to undermine the purpose for which the domains were introduced in the first place. The solution is to partition the FAs into domains not statically but periodically, partitioning at random each time. The random nature of the partitions can be ensured by an agreement protocol such as the Byzantine agreement.

Verification of Protocol Consistency

Figure 4A:
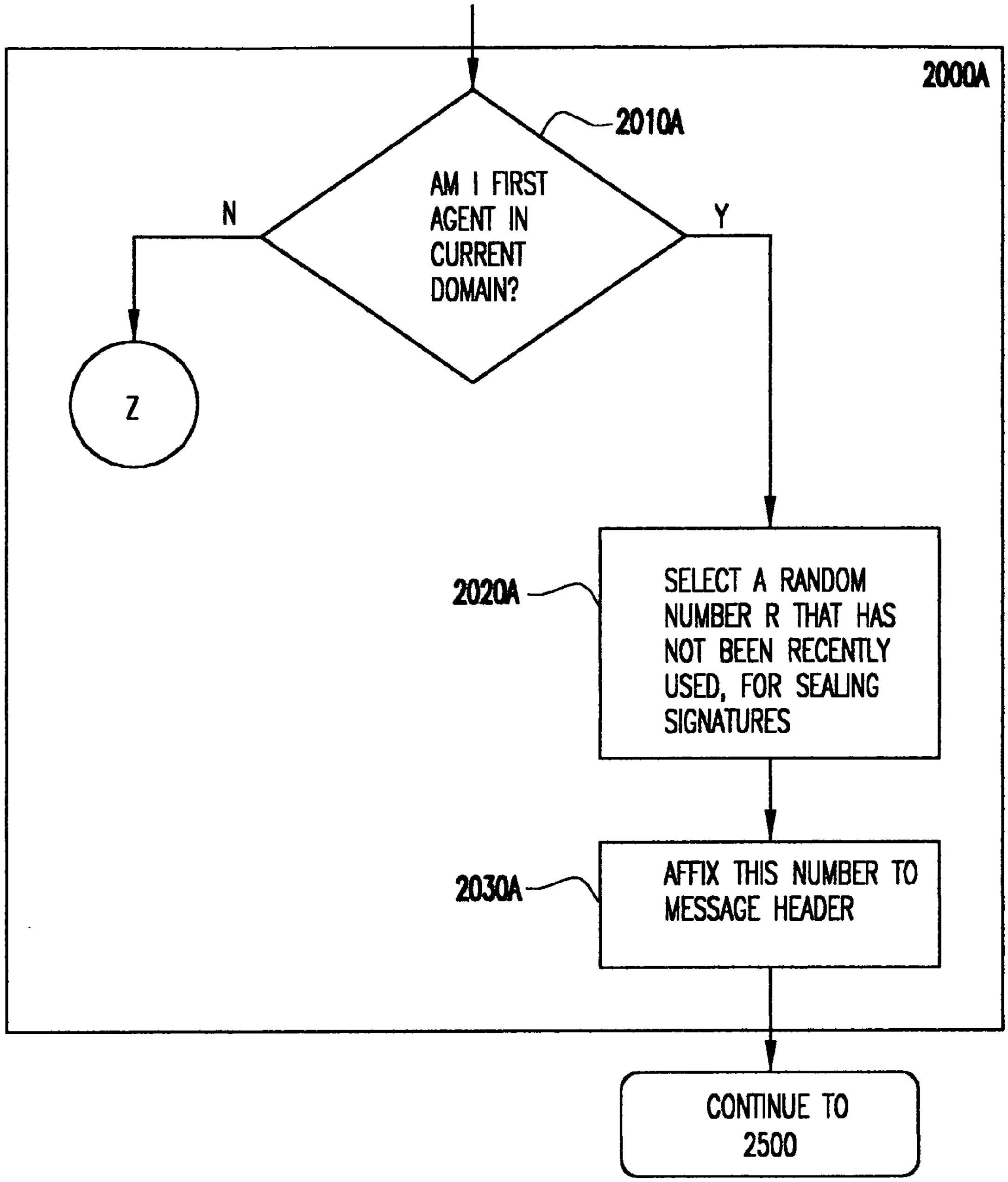
FIGS. 4A and 4B, taken together, are a flow diagram of the consistency verification as performed in the process of FIG. 2 according to the solution one protocol of the present invention.

In function block 2000 in FIG. 2, an agent A which has received the message verifies if the protocol has been followed correctly so far. This verification process followed in Solution One is illustrated in detail in FIGS. 4A and 4B. At the first step of this verification process, which is shown as decision block 2010A in FIG. 4A, the agent A checks whether it is the first agent to be visited in the current domain. If so, it selects at random a tag N which has not been recently used, in function block 2020A, and affixes it to the message header, in function block 2030A, before continuing to function block 2500 in FIG. 2.

Figure 4B:
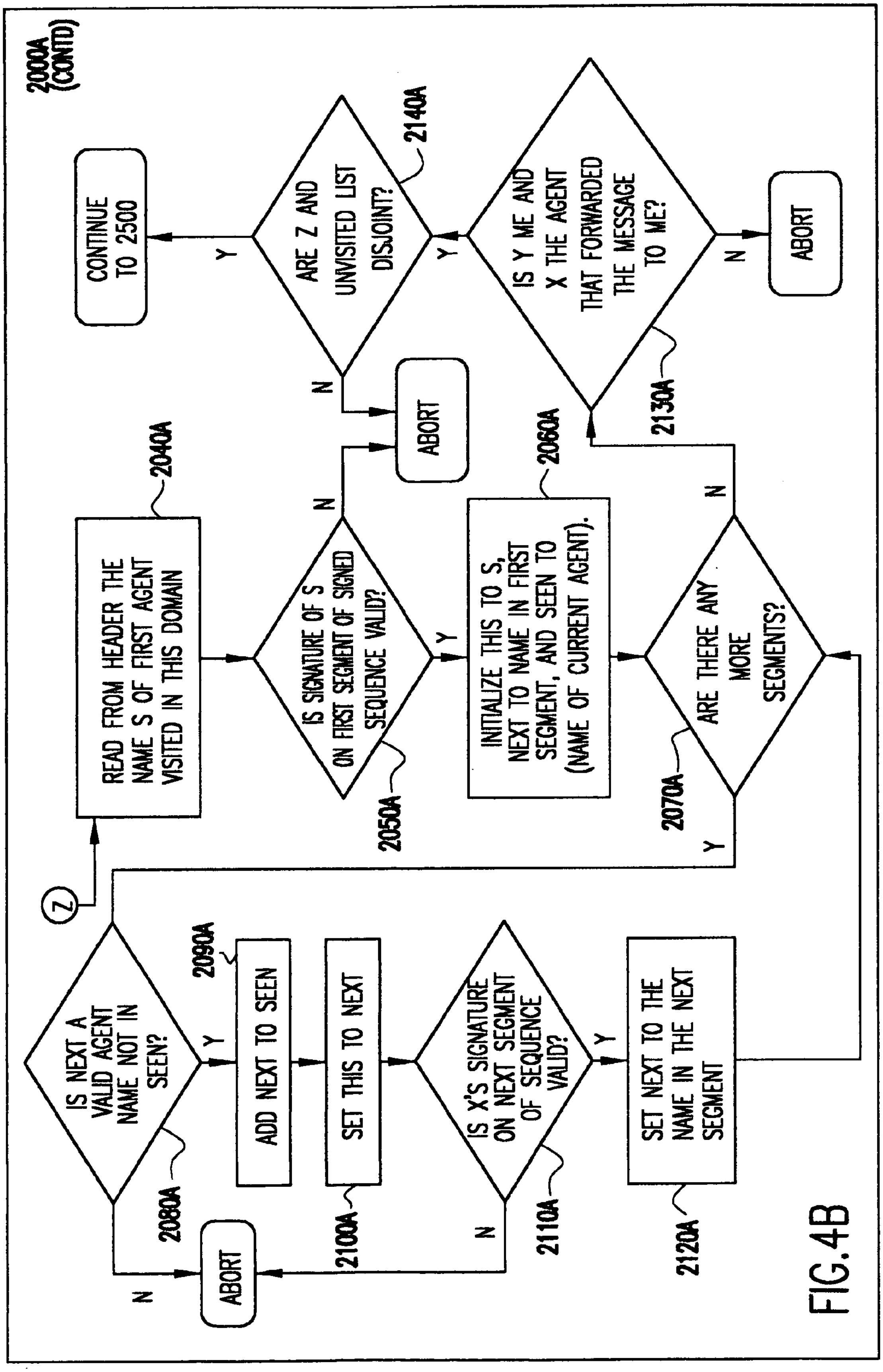

Otherwise, the next step in the verification process is the one shown in function block 2040A in FIG. 4B, where A finds out the name S of the first agent to receive this message in the current domain. Then, in decision block 2050A, A verifies the signature of S on the first part of the signed sequence in the message header. If this verification succeeds, then in function block 2060A the variable NEXT is initialized to name of the agent that received the message from S (this name is contained in the first part of the signed sequence). Also in function block 2060A, the set SEEN is initialized to contain A and the variable THIS is initialized to S. In decision block 2070A, A checks if there any segments that remain to be verified in the signed sequence. If not, A verifies if the name NEXT and THIS are the names of itself and the agent which forwarded the message to it, respectively, in decision block 2130A, and whether the set SEEN and the list of unvisited agents are disjoint, in decision block 2140A. If both verifications succeed, then the entire verification process is completed and execution continues to function block 2500.

If, on the other hand, more segments are found in decision block 2070A, then in decision block 2080A, A verifies that NEXT is a valid agent name not contained in Z. If so, A adds NEXT to the set SEEN, in function block 2090A, and sets the variable THIS to NEXT, in function block 2100A. In decision block 2110A, A verifies the signature of THIS on the next segment of the signed sequence. If the signature is correct, then in function block 2120A a new agent name NEXT is extracted from that segment. Following this, the execution comes back to decision block 2070A.

If any of the verifications in decision blocks 2050A, 2080A, 2110A, 2130A and 2140A fail, the current message is aborted.

Selecting the Next Agent

Figure 5:
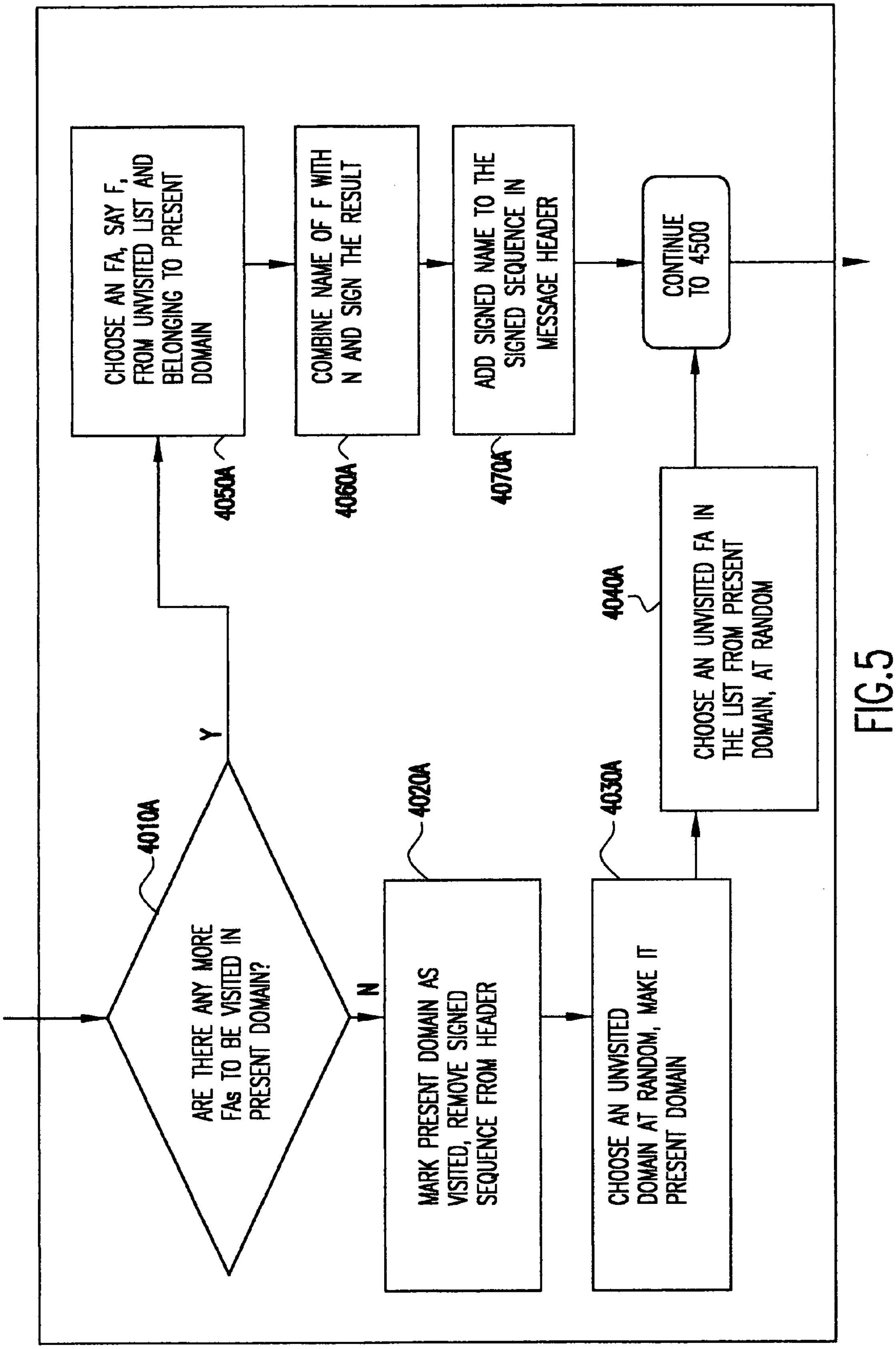
FIG. 5 is a flow diagram of the process of choosing an agent and modifying a header as performed in the process of FIG. 2 according to the solution one protocol of the present invention.

In function block 4000 in FIG. 2, an agent A which has received a message selects the next agent that will receive this message. FIG. 5 illustrates how this selection is performed in Solution One. The process begins at decision block 4010A where A checks if there are any more agents to be visited in the present domain. If not, then A marks the present domain as visited and removes the signed sequence from the message header in function block 4020A. Then in function block 4030A it chooses an unvisited domain at random and makes it the present domain. In function block 4030A, an agent belonging to the current domain is chosen at random from the list of unvisited agents. Following this, the execution continues to function block 4500 in FIG. 2.

If, instead, A finds in decision block 4010A that not all the agents in this domain have been visited, then in function block 4050A it chooses at random an unvisited agent belonging to the current domain. It then combines the random number N with the name of this chosen agent and signs the resulting plaintext in function block 4060A. In function block 4070A, this plaintext and signature is added to the signed sequence, following which the execution continues to function block 4500, where the message is forwarded to the chosen agent.

Protocol Correctness

When all the FAs are honest, it is clear that this protocol is double-blind. Let $A_i$ be the last FA in the sequence of FAs involved in forwarding a message meant for a pseudonym X. Let S be the first agent in the sequence. The protocol forwards a message such that it passes through each FA corresponding to the pseudonym exactly once. Thus, once an FA applies its decrypting key on the encrypted address and forwards the message, it does not get an opportunity to see the address at any later stage. Thus, only the last FA in the chain, $A_1$, is aware of the actual address. But it may be noted that no individual FA in the chain except for the originator S is aware of the pseudonym to which the message is addressed. Thus, S is aware of the pseudonym X associated with the message, $A_1$, is aware of the address associated with the message and the intermediate FAs can associate neither with the message. We thus have a de-linking of pseudonyms and actual addresses. Thus, the goal of receiver anonymity is achieved.

The resilience of the protocol in withstanding passive and active attackers within and outside the system will be next examined.

Security Analysis

We consider, in order, various types of attacks, ranging from external eavesdroppers, local or global, to attacks by a colluding set of FAs intended to break the anonymity guaranteed by the system. We will show how the system defends against these multifarious attacks and provide probabilistic bounds, where applicable, for the security provided by the system. There are essentially two parameters used for describing this security. The first parameter, which we shall term $P_C$, is the probability of an identity being compromised as a direct result of multiple colluding FAs being present in the system. The second parameter, $P_S$, measures the probability that a malicious coterie of colluding FAs manages to identify the originating FA of a message whose physical destination is known. This information does not directly endanger the anonymity of any client but may, in the long run, prove useful to attackers in deciding whom to compromise. We also mention various deterrents to attackers, these being measures which improve the security provided but not amenable to easy quantification.

Thus, qualitative and quantitative guarantees of security against attacks from within and without is provided.

Security Against External Attacks

Local Eavesdroppers

A local eavesdropper in this context is an attacker who can observe all and only communication emanating from a particular individual FA. If the FA that he or she monitors does not happen to be the last FA in a message forwarding sequence, then all that the eavesdropper sees is an encrypted address and a partition of the set of FAs involved in the forwarding into visited and unvisited FAs. Clearly, this information is of absolutely no use to him. He or she can find neither a pseudonym nor an address. Even if the monitored FA happens to be the last in a forwarding sequence, the eavesdropper gathers only an address. He or she may perhaps learn that the recipient is a client of the system but has no means of ascertaining the pseudonym used by the client. Thus, the system provides absolute privacy against local eavesdroppers.

Global Eavesdroppers

A global eavesdropper can potentially attempt to trace the course of a message through the FAs to the final destination. Unlike mixes (see Chaum), we do not provide a direct defense against a global eavesdropper. Tracing on the basis of message content by using a cryptographic system to encrypt communication between any two machines could be prevented. As for traffic analysis, the main defense is to render it difficult by spreading the FAs far and wide across several administrative and geographical domains, making it difficult for a global eavesdropper to exist (see Reiter).

Security Against Malicious FAs

When there are malicious agents in the list of k FAs corresponding to a pseudonym, they still cannot manipulate the list to their advantage by violating the protocol. In particular, they cannot reintroduce the names of FAs already visited so as to enhance the probability that the last FA in the sequence is malicious. Thus the best they can do is to avoid choosing the next agent randomly and instead choose a non-colluder this would eliminate a non-colluding contender for the opportunity to be the last FA in the sequence, thus improving the chances of the malicious agents remaining in the list.

The extent to which single and multiple malicious FAs which can compromise the system security will be further considered.

A Single Malicious FA

Consider the case when exactly one of the FAs is dishonest. When the FA acts passively, all the FA can gather is the address of some recipients whose messages happen to be forwarded by the FA. But this information is not very useful as the FA cannot associate any pseudonym with the addresses.

But the FA can cause more damage if the FA turns more active. The FA can attempt a known plaintext attack by sending hundreds of copies of the same message addressed to the same pseudonym. One of two scenarios will unfold.

1. The FA does not belong to the list of FAs needed for that particular pseudonym. In this case, there is nothing that the FA can learn. But the recipient will realize that someone is attempting an attack on him and will complain. The pseudonym of the sender can then be blacklisted.

This could prove an effective deterrent to such attacks.

2. The FA is a member of the list corresponding to the particular pseudonym. In this case, about 1/k th of the messages will end up with him at the last step. But, as mentioned earlier, there is an element of randomness introduced into each message so that even identical messages intended for the same pseudonym actually appear different after encryption. So, no correlation is possible on the basis of message content. To prevent correlation on the basis of the number of messages intended for a particular address, we have outlined the various restrictions imposed on the number of messages. These restrictions ensure that no member of the system receives an abnormally high number of messages within an interval of time. We thus have protection against active attacks by a single malicious FA.

Malicious FAs in Collusion

The only way that a malicious set of FAs can compromise an identity is if both the originator S and the last FA in the forwarding sequence both happen to be colluders. They could then compare the message content at each of their ends and thus figure out the association between the pseudonym and an actual address.

If there are c colluders in the collection of n forwarding agents and any agent is equally likely to be a colluder, the probability of an identity being compromised is given by $$P_c = \frac{\left(\frac{c}{n}\right)(c-1)}{(n-1)} = \frac{c(c-1)}{n(n-1)}$$

Consider the probability $P_S$ that the identity of an originator becomes associated with an address. For this to happen, there must be at least one malicious agent in the first domain and the last agent in the forwarding chain must also be malicious.

First let us compute the probability $P_{1+}$ that there is at least one colluding agent in the first domain. This is easily computed by using the probability of the complementary event. The probability of there being no colluders in the first domain is simply $$\frac{{}^{n-c}C_d}{{}^{n}C_d}.$$

Therefore, $$P_{1+} = 1 - \left(\frac{{}^{n-c}C_d}{{}^{n}C_d}\right)$$

The probability that the last agent in the forwarding sequence is a colluder is not independent of the number of colluders in the first domain. This probability is greatest when there are no colluders at all in the first domain. In this case, the probability that the last agent is a colluder is simply c/(n−d). We thus have an upper bound on PS, namely $$P_s \leq P_{1+}\left(\frac{c}{(n-d)}\right) = \left(1 - \left(\frac{{}^{n-c}C_d}{{}^{n}C_d}\right)\right) \times \frac{c}{(n-d)}$$

It may be noted that if the division of FAs into domains had been static instead of dynamic, this probability $P_S$ would effectively become 1 when confronted with determined attackers who would have enough time on their hands to select the agent they want to compromise and then compromise him.

Solution Two

Coordinating Agents

In addition to Forwarding Agents, Solution Two involves another set of agents called Coordinating Agents or CAs. There are r Coordinating Agents labeled with numbers i, $0 \leqq i \leqq r-1$. The CAs ensure that the protocol is executed correctly by the FAs and that no malicious FA can tamper with the protocol to break the anonymity that the system promises. The CAs participate in the protocol in the order of their labels. Essentially, they ensure that the number of unvisited FAs contained in the header is decremented correctly every time the message reaches a new FA. It may be noted that though a CA is functionally different from an FA, nothing prevents them from sharing the same physical systems.

The protocol followed by each CA is described in detail in a later section.

Signatures

Each message has a header which contains a list of FAs yet to be visited. It also contains the number of such unvisited FAs signed by the CA which has most recently participated in the protocol. As in Solution One, the signature process requires that a tag N for every message. This tag is a random number collectively chosen by all CAs. As in Solution One, the role of the tag is essentially to guard against forgery of signatures.

Verification of Protocol Consistency by an FA

Figure 6:
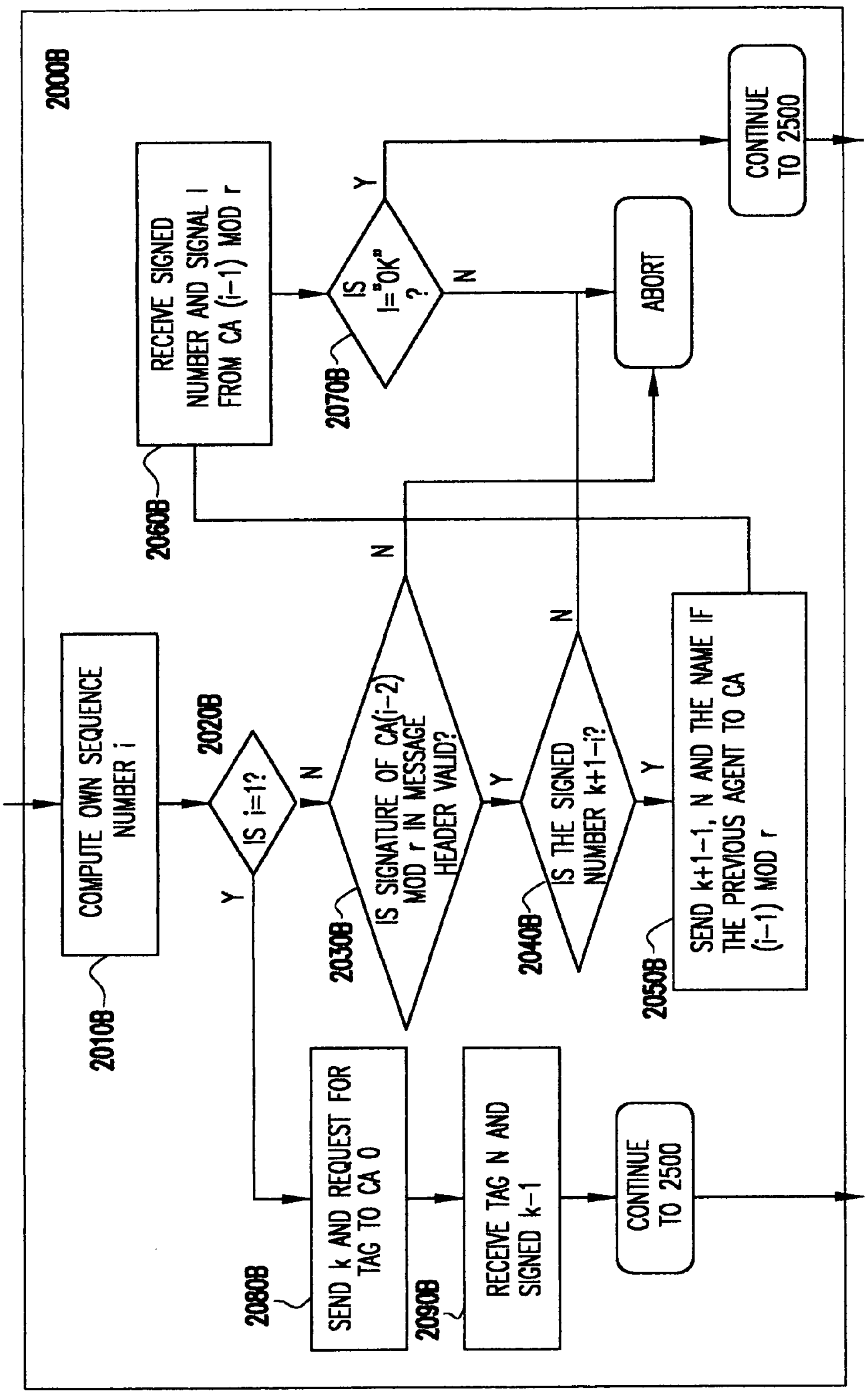
FIG. 6 is a flow diagram of the process of consistency verification in the process of FIG. 2 according to the solution two protocol of the present invention.

In function block 2000 in FIG. 2, a forwarding agent (FA) A verifies if the protocol has been followed consistently so far. In Solution Two, this verification is performed as illustrated in FIG. 6. In function block 2010B, A computes its own sequence number i in the path followed by this message through the set of forwarding agents. This number is computed by subtracting the number of FAs in the list of unvisited FAs from k+1. In decision block 2020B, A checks if i is 1. If i is 1, then A sends CA 0 a request for a tag, in function block 2080B, and receives the tag N as well as the number k−1, combined with N and signed, in function block 2090B. Following this, the execution continues to function block 2500 in FIG. 2.

If the number i is found in decision block 2020B to be different from 1, then in decision block 2030B, A verifies the signature of CA (i−2) mod r on the signed number in the message header. If verification succeeds, then in decision block 2040B A verifies if the signed number is k+1−i. If the verification succeeds, A sends the numbers k+1−i and N and the name of the previous FA to CA (i−1) mod r in function block 2050B. In function block 2060B, A receives a signed number and a signal from that CA. In decision block 2070B, A verifies if the signal is "OK". If that is the case, verification is complete and execution continues to function block 2500 in FIG. 2.

If any of the verifications in decision blocks 2020B, 2030B, 2040B and 2070B fail, A concludes that the protocol has not been executed correctly and aborts the current message.

Verification of Protocol Consistency by a CA

Figure 7A:
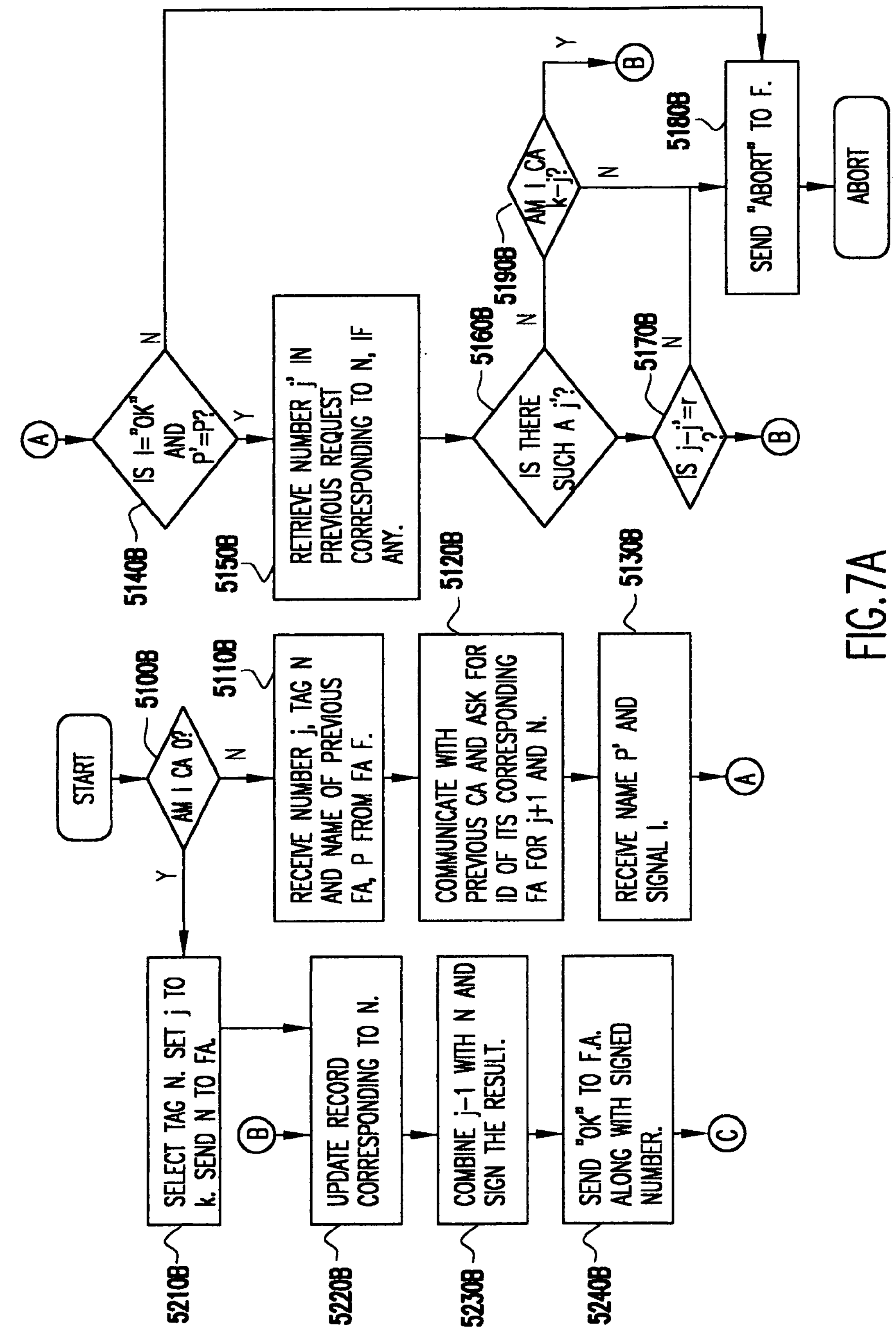
FIGS. 7A and 7B, taken together, are a flow diagram of the process of consistency verification in the solution two protocol executed by coordinating agents (CAs) of the present invention.
Figure 7B:
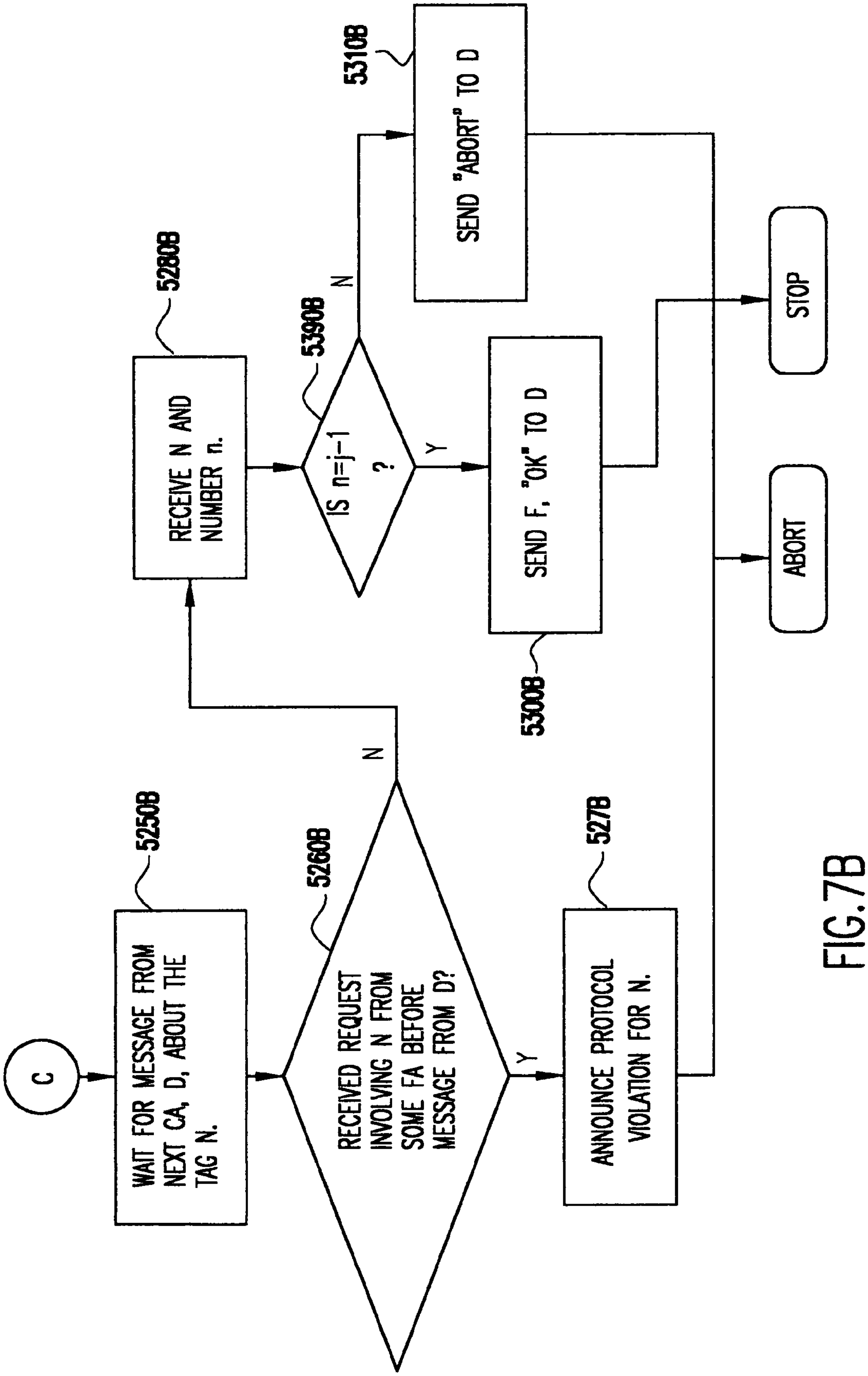

As described above, verification of protocol consistency requires communication between FAs and CAs. The protocol followed by a CA is illustrated in FIGS. 7A and 7B.

The role of CA 0 is somewhat different that other CAs. This difference is specified in FIG. 7A, where in decision block 5100B, a CA (whom we will refer to as C) verifies if it is CA 0. If that is the case, the request must be for a new tag. Accordingly, in function block 5210B, it selects a new tag N through some process of agreement with other CAs, and sends it to the requesting FA. It also sets the variable j to the value k. In function block 5220, C updates its record about the tag N; this record keeps a history of all recent actions performed by C involving N. Then it combines the number j−1 with N and signs the result (function block 5230B), and sends an "OK" signal to the requesting FA along with the signed number (function block 5240B). Following this, execution moves to function block 5250B in FIG. 7B.

Meanwhile, if in decision block 5100B, C finds that it is not CA 0, then in function block 5110B, it receives a numberj, tag N, and the identity of the previous FA, P, from the requesting FA, F. Then in function block 5120B, it contacts the previous CA (recall that the CAs are numbered in a sequence) B, and asks for the identity of the FA that had sent B a request involving j+1 and N. In function block 5130B, C receives a name P' and a signal I from B. In decision block 5140B, C verifies if I is "OK" and P is the same as P'. If this verification succeeds, then in function block 5150B, C retrieves from its records the number j' involved in the last request processed by it that contained the tag N. In decision block 5160B, C verifies if any such request was found. If no such request was found, then C verifies if it is CA k−j (decision block 5190), in which case execution continues to function block 5220B. If, on the other hand, a previous request is detected in decision block

5160B, then in decision block 5170B, C verifies if j−j'=r. If the verification succeeds, execution continues to function block 5220B. If any of the verifications in decision blocks 5140B, 5170B and 5190B fail, then in function block 5180B, C sends an "Abort" signal to F and terminates.

If the protocol is not terminated in FIG. 7A, then execution continues from function block 5240B in FIG. 7A to function block 5250B in FIG. 7B. In function block 5250B, C waits for a query from the next CA in the sequence, D, about the tag N. In decision block 5260B, C decides if it has received a request involving N from some FA before receiving a query involving N from D. If so, then in function block 5270B, C announces protocol violation involving tag N and terminates. Otherwise, in function block 5280B, C receives tag N and some number n from D. Next, in decision block 5290B, C verifies if n=j−1. If verification succeeds, it sends an "OK" signal along with the identity of F to D, and stops. Otherwise, it sends an "Abort" signal to D and terminates.

Figure 8:
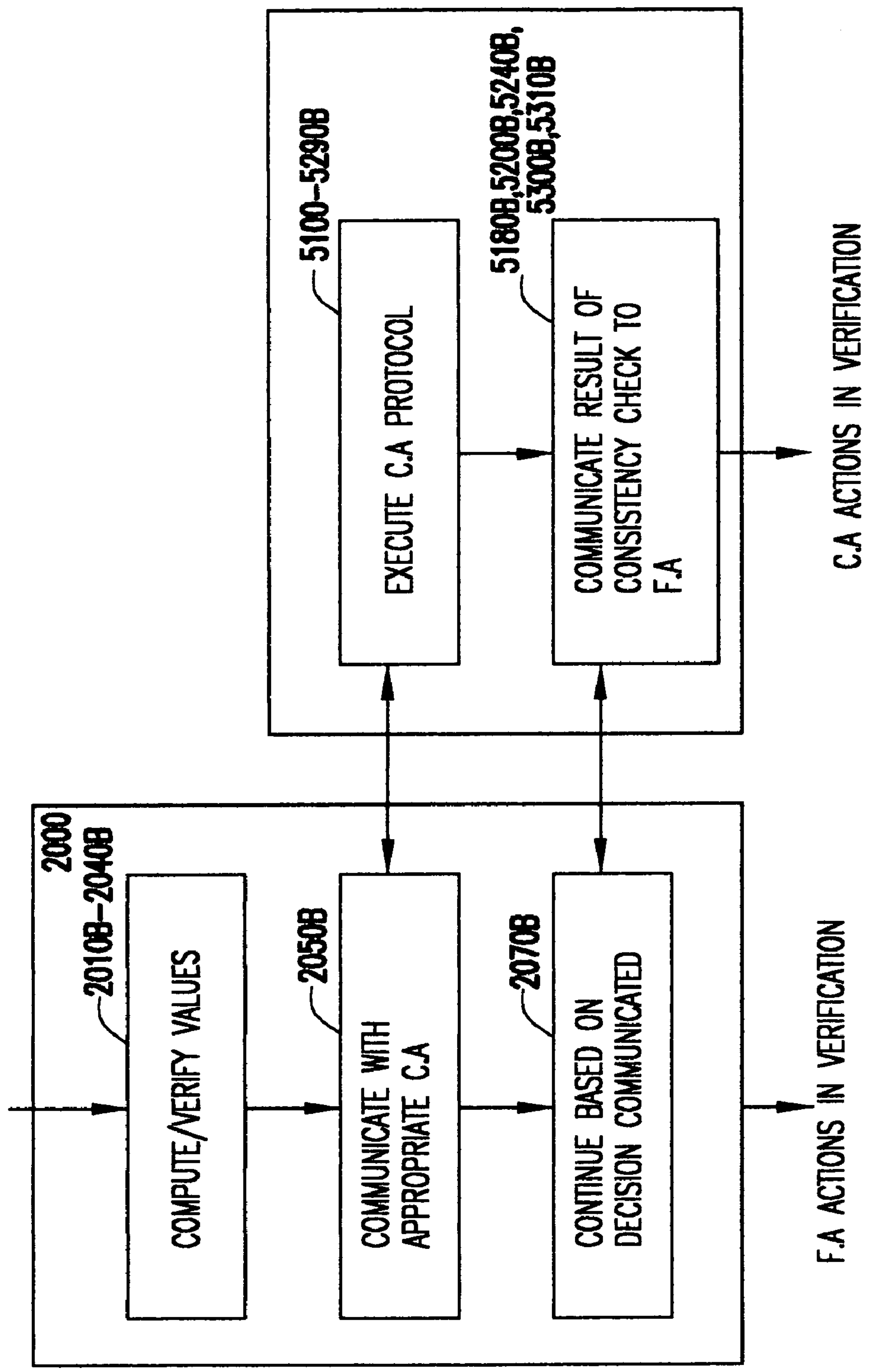
FIG. 8 is a flow diagram of protocol consistency in the solution two protocol of the present invention.

The verification of protocol consistency in Solution Two is summarized in FIG. 8. After computing and verifying values in blocks 2010B to 2040B in FIG. 6, the FA communicates with the appropriate CA in function block 2050B. The CA, in turn, executes its CA protocol in blocks 5100B to 5290B in FIGS. 7A and 7B. The result of the consistency check as determined in blocks 5180B, 5200B, 5240B, 5300B, and 5310B are communicated to the FA which, in function block 2070B, continues based on the decision communicated.

Selecting the Next Agent

Figure 9:
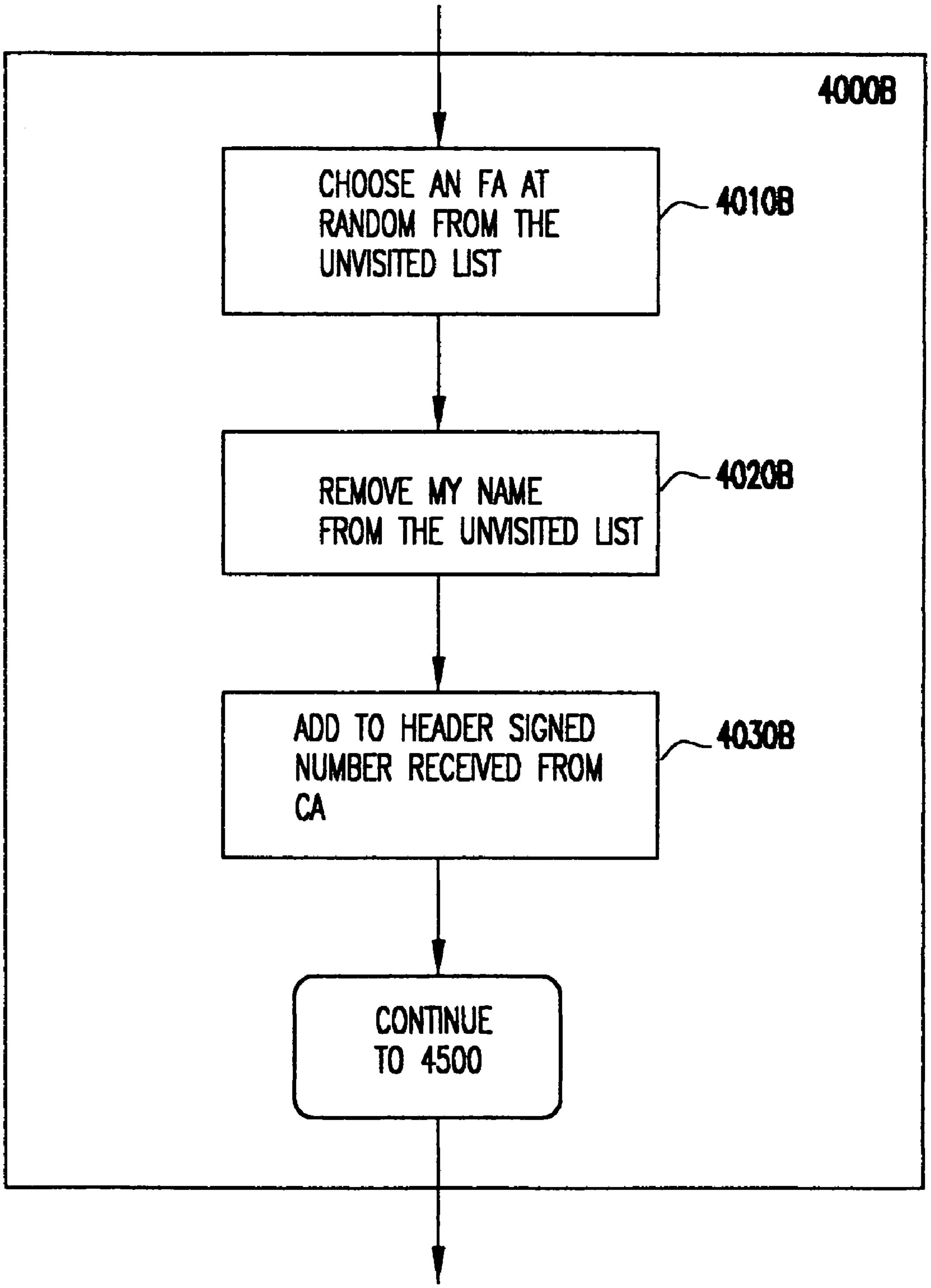
FIG. 9 is a flow diagram of the process of choosing an agent and modifying a header in the solution two protocol according to the invention.

FIG. 9 illustrates in detail the process of selecting the next agent in Solution Two. This process, which corresponds to function block 4000 in FIG. 2, begins at function block 4010B, where the current forwarding agent (FA), A, chooses an FA at random from the list of unvisited FAs in the message header. Following this, in function block 4020B, A removes its own name from the list. In function block 4030B, A adds the signed number that it received from the appropriate CA to the message header. Execution then continues to function block 4500 in FIG. 2.

Protocol Correctness

When all the FAs are honest, it is clear that this protocol is double-blind. Let $A_1$ be the last FA in the sequence of FAs involved in forwarding a message meant for a pseudonym X. Let S be the first agent in the sequence. The protocol forwards a message such that it passes through each FA corresponding to the pseudonym exactly once. Hence, once an FA applies its decrypting key on the encrypted address and forwards the message, it does not get an opportunity to see the address at any later stage. Therefore, only the last FA in the chain, $A_1$, is aware of the actual address. But it may be noted that no individual FA in the chain except for the originator S is aware of the pseudonym to which the message is addressed. Thus, S is aware of the pseudonym X associated with the message, $A_1$ is aware of the address associated with the message and the intermediate FAs can associate neither with the message. The CAs also do not see either the pseudonym or the address. We thus have a de-linking of pseudonyms from actual addresses. Thus, the goal of receiver anonymity is achieved.

Security Analysis

We consider, in order, various types of attacks, ranging from external eavesdroppers, local or global, to attacks by a colluding set of FAs and CAs intended to break the anonymity guaranteed by the system. We will show various defenses against these multifarious attacks and provide probabilistic bounds, where applicable, for the security provided by the system. There are essentially two parameters used for describing this security. The first parameter, which we shall term $P_C$, is the probability of an identity being compromised as a direct result of multiple colluding FAs being present in the system. The second parameter, $P_S$, measures the probability that a malicious coterie of colluding FAs and CAs manages to identify the originating FA of a message whose physical destination is known. This information does not directly endanger the anonymity of any client but may, in the long run, prove useful to attackers in deciding whom to compromise.

We also mention various deterrents to attackers, these being measures which improve the security provided but not amenable to easy quantification.

We thus provide qualitative and quantitative guarantees of security against attacks from within and without.

Security Against External Attacks

The security against external attacks is exactly identical to that of Solution One. Please refer to the corresponding section for Solution One for further details.

Security Against Malicious FAs and CAs

When there are malicious agents in the Forwarding Set (corresponding to a pseudonym) or Coordinating Set, they still cannot manipulate the list to their advantage by violating the protocol. In particular, they cannot reintroduce the names of FAs already visited so as to enhance the probability that the last FA in the sequence is malicious.

Consider the following scenario. Let a malicious FA, F, receive a message in the process of being forwarded. If there were a malicious CA, C, whose ordinal number is t, then F could introduce the names of other malicious agents that have been visited and contact C for the signing procedure. The number of agents introduced would depend on t (CA whose ordinal number is j, has to sign a number which is of the form k−l*j, l=1,2, . . . where k is the total number of FAs involved in forwarding of a message This attack fails due to the fact that the CAs communicate with each other at every message forwarding step. Thus, if C were to be contacted by F at some stage of the forwarding process, then either the CA which was involved in the previous step or the one involved in the current step would not receive any communication from the next CA, which would be communicating with C instead. This detects the violation of the protocol and the message involved can be thrown out of the system. Thus, the best that corrupt FAs can do is to avoid choosing the next agent randomly and instead choose a non-colluder; this would eliminate a non-colluding contender for the opportunity to be the last FA in the sequence, thus improving the chances of the malicious agents remaining in the list. We will now consider the extent to which single and multiple malicious FAs can compromise the system security.

A Single Malicious FA

The situation is exactly identical to the corresponding case in Solution One.

Malicious FAs in Collusion

Even when there are colluding agents in the Coordinating set, they are not of much use to the colluding agents in the Forwarding set, simply because the latter's position in the path determines which Coordinating agent to contact. The FAs themselves have no freedom in the matter.

If it so happens that a corrupt FA ends up paired with a corrupt Coordinator, it is indeed possible to introduce one previously visited corrupt agent back into the list. But the odds against such a situation happening often enough in the course of one message are very high. The only way that a malicious set of FAs can compromise an identity is if both the originator S and the last FA in the forwarding sequence both happen to be colluders. They could then correlate the message content at each of their ends and thus figure out the association between the pseudonym and an actual address.

If there are c colluders in the collection of n forwarding agents and any agent is equally likely to be a colluder, the probability of an identity being compromised is given by $$P_c = \frac{\left(\frac{c}{n}\right)(c-1)}{(n-1)} = \frac{c(c-1)}{n(n-1)}$$

We next consider the probability $P_S$ that the identity of the originating FA for a message becomes associated with the physical address of a recipient. For this to happen, the last FA in the sequence has to be malicious. Further, we note that the identity of the originator is known to only three agents-the originator himself, the second FA in the forwarding sequence (since he receives the message from the originator) and CA 0. CA 0 does not see the message itself. So, CA 0 and the last FA cannot identify a correlation on the basis of message content. But the random number associated with the message could be used to do the correlation. In defence, we could periodically reassign the numbers allotted to the CAs so that CA 0 is not statically determined. Then, the probability that the identity of the originator is compromised is simply c/n multiplied by the probability that at least one of the three agents specified is corrupt. This probability P, is easily computed as 1 minus the probability that none of these agents are corrupt. Thus, $$P_{1+} = 1 - \frac{{}^{n-c}C_3}{{}^{n-l}C_3}$$

Therefore, $$P_s = P_{1+}\left(\frac{c}{n}\right) = \left(\frac{c}{n}\right)\left(1 - \frac{{}^{n-c}C_3}{{}^{n-l}C_3}\right)$$

CONCLUSION

We have presented a new approach to achieving receiver anonymity and have outlined a system that enables a double-blind communication in which neither the sender nor the receiver of the communication is aware of his correspondent's true identity. We have also shown the security of the system against local and global eavesdroppers. We have described various attacks on the system and how they may be repulsed. We have provided qualitative and quantitative measures of the security of the system in the face of malicious agents.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A method for communication between two entities in a set of clients across a network such that their identities are concealed from each other comprising the steps of:

providing a set of Forwarding Agents (FAs), there being n FAs and a plurality of groups of these n agents, each of which consists of a plurality of k members, where k is a fixed number considered sufficient to provide anonymity in the system and each FA belongs to at least one group;

providing each of the FAs with its own pair of public and private keys for encryption and decryption, respectively, where the underlying cryptosystem scheme is a commutative public key cryptosystem, each FA also having appropriate keys required to perform secure digital signatures on documents and to verify the signatures of other FAs;

registering each client with a Forwarding Agent S, the client once having selected a Forwarding Agent S, and picking one of the groups that the Forwarding Agent S belongs to, thus selecting k agents to be associated with the client, the step of registering including assigning a pseudonym X to the client and providing the Forwarding Agent S with an encrypted form of the client's network address, the encrypted form being created by successively encrypting by the client the client's network address with the public keys of the k selected agents to obtain an encrypted address thereby rendering the network address unreadable to any individual FA;

maintaining by each FA a table with three fields, a pseudonym, a corresponding encrypted network address and the FA group to be used for forwarding;

delivering a message meant for a pseudonym X to Forwarding Agent (FA) S where X is registered using a protocol that protects the anonymity of the sender; and passing the message through a random sequence of FAs in the group to which Forwarding Agent S belongs until a FA in the group finds a visible network address and then sending the message on to this address.

2. A method for communication between two entities in a set of clients across a network such that their identities are concealed from each other and no third party is able to trace the communication comprising the steps of:

providing a set of Forwarding Agents (FAs), there being n FAs and several groups of these n agents, each of which consists of k members, where k ($0<k\leqq n$) is a fixed number considered sufficient to provide anonymity in the system and each FA belongs to at least one group;

providing each of the FAs with its own pair of public and private keys for encryption and decryption, respectively, where the underlying cryptosystem scheme is a commutative public key cryptosystem, each FA also having appropriate keys required to perform secure digital signatures on documents and to verify the signatures of other FAs;

registering each client with a Forwarding Agent S, the client once having selected a Forwarding Agent S, also picking one of the groups that the Forwarding Agent S belongs to, thus selecting k agents to be associated with the client, the step of registering including assigning a pseudonym X to the client and providing the Forwarding Agent S with an encrypted form of the client's network address, rendering it unreadable to any individual FA;

maintaining by each FA a table with three fields, a pseudonym, a corresponding encrypted network address and the FA group to be used for forwarding;

delivering a message meant for a pseudonym X to Forwarding Agent (FA) S where X is registered using a protocol that protects the anonymity of the sender;

passing the message through a random sequence of FAs in the group to which Forwarding Agent S belongs; and finding by the last FA in the sequence a visible network address and sending the message on to this address, wherein the step of registering comprises the steps of:

successively encrypting by the client the client's network address with the public keys of the k selected agents to obtain an encrypted address, referred to as the "onion address" of the client;

sending by the client to the Forwarding Agent (FA) S a Registration Message which contains the client's onion address and a chosen pseudonym X, and also identifies the group of k agents selected by the client; and adding by the Forwarding Agent the information contained in the Registration Message to its table.

3. The method for communication recited in claim 2, wherein the Registration Message is sent using a protocol which protects the anonymity of the sender.

4. The method for communication recited in claim 3, wherein the protocol used comprises the Forwarding Agent (FA) S having a publicized pseudonym and the client sending a message to that pseudonym.

5. A method for communication between two entities in a set of clients across a network such that their identities are concealed from each other and no third party is able to trace the communication comprising the steps of:

providing a set of Forwarding Agents (FAs), there being n FAs and several groups of these n agents, each of which consists of k members, where k ($0<k\leqq n$) is a fixed number considered sufficient to provide anonymity in the system and each FA belongs to at least one group;

providing each of the FAs with its own pair of public and private keys for encryption and decryption, respectively, where the underlying cryptosystem scheme is a commutative public key cryptosystem, each FA also having appropriate keys required to perform secure digital signatures on documents and to verify the signatures of other FAs;

registering each client with a Forwarding Agent S, the client once having selected a Forwarding Agent S, also picking one of the groups that the Forwarding Agent S belongs to, thus selecting k agents to be associated with the client, the step of registering including assigning a pseudonym X to the client and providing the Forwarding Agent S with an encrypted form of the client's network address, rendering it unreadable to any individual FA;

maintaining by each FA a table with three fields, a pseudonym, a corresponding encrypted network address and the FA group to be used for forwarding;

delivering a message meant for a pseudonym X to Forwarding Agent (FA) S where X is registered using a protocol that protects the anonymity of the sender;

passing the message through a random sequence of FAs in the group to which Forwarding Agent S belongs; and finding by the last FA in the sequence a visible network address and sending the message on to this address, wherein once the Forwarding Agent (FA) S obtains a message intended for X, the Forwarding Agent S performs the steps of:

looking up X in its internal table and retrieving an encrypted version of the address of X, referred to as the "onion address" of X, as well as the group of FAs to be used for forwarding;

creating the list of the FAs that the message will pass through, which list includes all FAs other than S who will have to "peel the onion" before the address of the intended recipient is revealed, the list containing all the members of the appropriate group except the Forwarding Agent S itself; and affixing the list to the head of the message.

6. The method of communication recited in claim 5, further comprising the step of encrypting the message before forwarding it to FAs in the sequence.

7. The method of communication recited in claim 6, wherein the step of encrypting comprises the steps of:

splitting the message into blocks of a fixed size;

prefixing each block with a fixed number of random bits, producing blocks of a larger size; and encrypting each block of a larger size with the public key or shared symmetric key of the intended recipient.

8. The method of communication recited in claim 6, wherein each FA which receives the message performs some verifications to ensure protocol consistency by other FAs.

9. The method of communication recited in claim 8, wherein the verifications comprise the steps of:

checking by an agent whether it is the first agent to be visited in the current domain and, if so, selecting at random a tag N which has not been recently used and affixing the tag to the message header before passing the message on;

otherwise, finding out the name S of the first agent to receive this message in the current domain;

verifying a signature of S on a first part of the signed sequence in the message header and, if this verification succeeds, then verifying that every successive segment of the signed sequence bears the valid signature of the agent named in the preceding segment;

verifying that the last segment of the signed sequence contains the name of the agent performing the verification, while the penultimate segment contains the name of the agent from which the message was received;

verifying that the list of unvisited agents does not contain any agents named in the signed sequence; and if any of the verifications fail, aborting the current message.

10. The method of communication recited in claim 8, wherein the verifications comprise the steps of:

computing the agent's own sequence number i in the path followed by this message through the set of forwarding agents by subtracting the number of FAs in the list of unvisited FAs from k+1;

checking if i is 1 and, if i is 1, then sending a coordinating agent (CA) 0 a request for a tag and receiving the tag N as well as the number k−1, combined with N and signed before passing the message on;

if the number i is found to be different from 1, then verifying the signature of CA (i−2) mod r on the signed number in the message header and, if verification succeeds, then verifying if the signed number is k+1−i and, if the verification succeeds, sending the numbers k+1−i and N and the name of the previous FA to CA (i−1) mod r;

receiving a signed number and a signal from CA (i−1) mod r and verifying if the signal is "OK" and, if so, verification is complete and the message is passed on; but if any of the verifications fail, concluding that the protocol has not been executed correctly and aborting the current message.

11. The method of communication recited in claim 10, wherein the CA, upon receiving a request from some FA, referred to as P, for a tag, performs the steps of:

selecting a tag N and sending it to P;

combining the tag N with a number k−j, signing the result and sending the signed number to P along with an "OK" signal;

waiting for a message about the tag N, and upon receiving such a message, verifying if it came from the next CA referred to as D, and if the message did not come from D, announcing a protocol violation in receiving tag N;

otherwise, verifying the message involves the number k−1, and if this verification fails, sending an "Abort" message to D; but if the verification passes, sending to D an "OK" signal and the identity of P.

12. The method of communication recited in claim 10, wherein any CA other than CA 0, upon receiving a message from some FA referred to as P, performs the steps of:

finding a number j, a tag N, and the identity of P, the previous FA, in the message;

sending a message to the previous CA asking for the name of the corresponding FA, for tag N, and number j+1;

receiving a signal and a table from the previous CA, and verifying that the signal is "OK" and the name is P, and if such verification fails, sending an "Abort" signal to P;

otherwise, verifying that the most recent request, if any, involving the tag N involved the number j+1, verifying that it is the $(k-j)^{th}$ CA, and if either of these verifications fails, sending an "Abort" signal to P;

but if the verifications pass, combining j−1 with N, signing the result and sending the signed number to P along with an "OK" signal;

waiting for a message about the tag N, and upon receiving such a message, verifying if it came from the next CA referred to as D, and if the message did not come from D, announcing a protocol violation in writing tag N;

otherwise, verifying the message involves the number j−1, and if this verification fails, sending to D an "OK" signal and the identity of P.

13. The method of communication recited in claim 5, wherein a next FA is chosen comprising the steps of:

checking by an agent if there are any more agents to be visited in the present domain and, if not, then marking the present domain as visited and removing the signed sequence from the message header;

choosing an unvisited domain at random and making it the present domain;

choosing an agent belonging to the current domain at random from the list of unvisited agents and, following this, passing the message on to the chosen agent;

if, instead, the agent finds that not all the agents in the domain have been visited, then choosing at random an unvisited agent belonging to the current domain;

combining the random number N with the name of the chosen agent and signing the resulting plaintext; and adding the plaintext and signature to the signed sequence, following which the message is forwarded to the chosen agent.

14. The method of communication recited in claim 5, wherein a next FA is chosen comprising the steps of:

choosing by a current forwarding agent an FA at random from the list of unvisited FAs in the message header;

removing its own name from the list;

adding the signed number that it received from an appropriate coordinating agent (CA) to the message header; and forwarding the message to the next chosen agent.

* * * * *